US008086462B1

(12) United States Patent
Alonso et al.

(10) Patent No.: US 8,086,462 B1
(45) Date of Patent: Dec. 27, 2011

(54) AUTOMATIC DETECTION, SUMMARIZATION AND REPORTING OF BUSINESS INTELLIGENCE HIGHLIGHTS FROM AUTOMATED DIALOG SYSTEMS

(75) Inventors: Tirso M. Alonso, New Providence, NJ (US); Shona Douglas, Madison, NJ (US); Mazin G. Rahim, Warren, NJ (US); Benjamin J. Stern, Morris Township, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1140 days.

(21) Appl. No.: 10/936,835

(22) Filed: Sep. 9, 2004

(51) Int. Cl.
*G10L 21/00* (2006.01)
*G10L 15/28* (2006.01)
*H04M 1/64* (2006.01)

(52) U.S. Cl. ..... 704/275; 704/251; 704/270; 704/270.1; 379/88.01

(58) Field of Classification Search .................. 704/251, 704/270, 270.1, 275; 379/88.01
See application file for complete search history.

(56) References Cited

U.S. PATENT DOCUMENTS

| | | | | |
|---|---|---|---|---|
| 5,544,040 | A * | 8/1996 | Gerbaulet | 705/26 |
| 5,842,173 | A * | 11/1998 | Strum et al. | 705/2 |
| 5,883,940 | A * | 3/1999 | Thornton | 379/88.2 |
| 6,219,643 | B1 | 4/2001 | Cohen et al. | |
| 6,349,290 | B1 * | 2/2002 | Horowitz et al. | 705/35 |
| 6,418,440 | B1 * | 7/2002 | Kuo et al. | 704/2 |
| 6,560,329 | B1 * | 5/2003 | Draginich et al. | 379/265.02 |
| 6,606,744 | B1 * | 8/2003 | Mikurak | 717/174 |
| 6,760,727 | B1 * | 7/2004 | Schroeder et al. | 707/10 |
| 6,769,876 | B2 | 8/2004 | Sakai et al. | |
| 6,807,574 | B1 * | 10/2004 | Partovi et al. | 709/224 |
| 6,810,328 | B2 * | 10/2004 | Yokota et al. | 701/210 |
| 6,904,143 | B1 * | 6/2005 | Peterson et al. | 379/265.01 |
| 6,965,872 | B1 * | 11/2005 | Grdina | 705/26 |
| 7,076,427 | B2 * | 7/2006 | Scarano et al. | 704/270 |
| 7,133,828 | B2 * | 11/2006 | Scarano et al. | 704/251 |
| 7,184,539 | B2 * | 2/2007 | Colson et al. | 379/88.13 |
| 7,251,595 | B2 | 7/2007 | Yasuda et al. | |
| 2002/0010624 | A1 * | 1/2002 | Tomita et al. | 705/14 |
| 2002/0035474 | A1 * | 3/2002 | Alpdemir | 704/270 |
| 2002/0076019 | A1 * | 6/2002 | Tandon et al. | 379/114.14 |
| 2003/0036686 | A1 | 2/2003 | Iliff | |
| 2004/0042592 | A1 | 3/2004 | Knott et al. | |

(Continued)

FOREIGN PATENT DOCUMENTS

EP 1 076 329 2/2001

(Continued)

OTHER PUBLICATIONS

Abella etl al, "Dialog trajectory analysis," Acoustics, Speech, and Signal Processing, Proceedings. (ICASSP '04). IEEE International Conference on , May 2004, pp. 441-444.*

*Primary Examiner* — Eric Yen (57) ABSTRACT

A method and system for reporting data from a spoken dialog service is disclosed. The method comprises extracting data regarding user dialogs using a dialog logging module in the spoken dialog service, analyzing the data to identify trends and reporting the trends. The data may be presented in a visual form for easier consumption. The method may also relate to identifying data within the control or outside the control of a service provider that is used to adjust the spoken dialog service to maximize customer retention.

13 Claims, 7 Drawing Sheets

U.S. PATENT DOCUMENTS

| | | | |
|---|---|---|---|
| 2004/0102898 A1* | 5/2004 | Yokota et al. | 701/210 |
| 2004/0234065 A1* | 11/2004 | Anderson | 379/88.14 |
| 2005/0086086 A1* | 4/2005 | Mack | 705/5 |

FOREIGN PATENT DOCUMENTS

| | | |
|---|---|---|
| JP | 08-117210 | 5/1996 |
| JP | 08-255150 | 10/1996 |
| JP | 90-81632 | 3/1997 |
| JP | 10-049515 | 2/1998 |
| JP | 10-091188 | 4/1998 |
| JP | 10-254491 | 9/1998 |
| JP | 2000-293194 | 10/2000 |
| JP | 2001-142484 | 5/2001 |
| JP | 2002-278589 | 9/2002 |
| JP | 2002-287790 | 10/2002 |
| JP | 2003-090298 | 3/2003 |
| JP | 2003-255986 | 9/2003 |
| JP | 2004-101637 | 4/2004 |

* cited by examiner

```
Send query to SBCC Daytona DB                              _ □ X
File  Edit  View  Favorites  Tool  Help
← Back  →  ⊠ ⬜ ⬜    🔍Search  ☆Favorites  ⊘Media   ⊘ ⊠ ⬜ W ⬜
Address | http://alrazi.research.att.com/~                  ▽  𝒫 Go
```

BillPull
                    BTNNotFound

FinalActionableClass    NO RESTRICTION
(Select 1 or more)      Ask(Bill_Change)_V
                        Ask(Bill)_V
                        Ask(Cancel)_V
                        Ask(Change)_V
                        Ask(Info)_V
                        Ask(Order)_V
                        Ask(Payment)_V
                        Ask(PIN)_V
                        Ask(Status)_V                     ⎫
                                                          ⎬ 508
                        NO RESTRICTION                    ⎭
                        Ask(Bill_Charge)_V
FinalDMCat              Ask(Bill_Charge)_V+CCSurcharge
(Select 1 or more)      Ask(Bill_Charge)_V+MUC
                        Ask(Bill_Charge_V+Other
                        Ask(Bill_Charge)_V+RegFees
                        Ask(Bill_Charge_V+UnrecognizedNumber
                        Ask(Cancel)_V
                        Ask(Cancel)_V+DnisType=CallingCard
                        Ask(Cancel)_V+EntireAccount Format for query results: [Table] [Comparison plots] [Seecalls] — 510

For comparison plots, specify the comparison time period:
  Starting date and time  [2004▽][March ▽][24▽][08:00:00](HH:mm:ss) ⎫
                                                                     ⎬ 512
  Ending date and time    [2004▽][March ▽][30▽][17:00:00](HH:mm:ss) ⎭

Table output is sorted by starting date and time.           ⎫
  to refine the sort, choose one:                           ⎬ 514
  ⦿None○ANI ○ DNIS ○ RoutingDest ○ ErrorReason             ⎭
    ○ FinalActionableClass  ○ FinalDMCat

| NLS | DialogID | Srv | Date | Start | End | Duration | NTurns | ANI | DNIS | RequestDest | ErrorReason | FinalClass |
|---|---|---|---|---|---|---|---|---|---|---|---|---|
| | 9A0E0003-0C06AF13 | 2 | 2004-02-24 | 08:58:48 | 08:58:48 | 47.3 | 4 | 2148416111 | 2004 | RequestCopyBill | LFPTransferFlag | Request (Billing) |
| | 86OE0003-0C03C281 | 2 | 2004-02-24 | 09:04:36 | 09:04:36 | 164.2 | 8 | 2708987924 | 1937 | RouteToBillingAsk | RAMCIA | Request (Billing) |
| 🕾 | 9B0E0003-0C038290 | 2 | 2004-02-24 | 09:12:01 | 09:12:01 | 133.3 | 6 | 2515785888 | 1937 | RouteToBillingAsk | PerICM | Request (Billing) |
| | 9A0E0003-0C06AFC0 | 2 | 2004-02-24 | 09:20:05 | 09:20:05 | 116.9 | 8 | 8142375739 | 1937 | RequestCopyBill | | Request (Billing) |
| | 9A0E0003-0C06AFF7 | 2 | 2004-02-24 | 09:25:29 | 09:25:29 | 98.1 | 6 | 6088452233 | 1937 | RequestCopyBill | MultipleAccountFound | Request (Billing) |
| | 99OE0003-0C064758 | 2 | 2004-02-24 | 09:27:59 | 09:27:59 | 104.0 | 8 | 4098331783 | 2004 | Goodbye | NoToAnotherBillCopy | Request (Billing) |
| 🕾 | 9B0E0003-0C0352C8 | 2 | 2004-02-24 | 09:34:16 | 09:34:16 | 69.2 | 4 | 2122061887 | 1937 | RequestCopyBill | LFPTransferFlag | Request (Billing) |
| | 9A0E0003-0C06B05B | 2 | 2004-02-24 | 09:37:01 | 09:37:01 | 101.9 | 6 | 8037440195 | 1936 | RouteToBillingAsk | RAMCIA | Request (Billing) |
| 🕾 | 9B0E0003-0C038338 | 2 | 2004-02-24 | 10:04:09 | 10:04:09 | 70.3 | 6 | 7657470398 | 2004 | RequestCopyBill | ExceedGetBTNTries | Request (Billing) |
| | 87OE0003-0C06007A | 2 | 2004-02-24 | 10:07:21 | 10:07:21 | 89.1 | 5 | 5018256675 | 1936 | Goodbye | NoToBillCopiesOrderRequest | Request (Billing) |

AUTOMATIC DETECTION, SUMMARIZATION AND REPORTING OF BUSINESS INTELLIGENCE HIGHLIGHTS FROM AUTOMATED DIALOG SYSTEMS

BACKGROUND OF THE INVENTION

1. Field of the Invention

The present invention relates to spoken dialog systems and more specifically to a system and method of detecting, summarizing and reporting information from automated dialog systems.

2. Introduction

Spoken language dialog systems are becoming more popular and affordable for many companies. These systems provide users and customers with a voice interface to a company wherein the user can speak in a natural manner to provide and receive information. As these spoken dialog systems become more common, much information about their operation becomes available from their system logs. AT&T's VoiceTone® service is an example of a voice dialog system that can be developed for a particular company or purpose. Since these systems are automated, they can provide a huge amount of data on system operation which has application for a number of different audiences.

Figure 1:
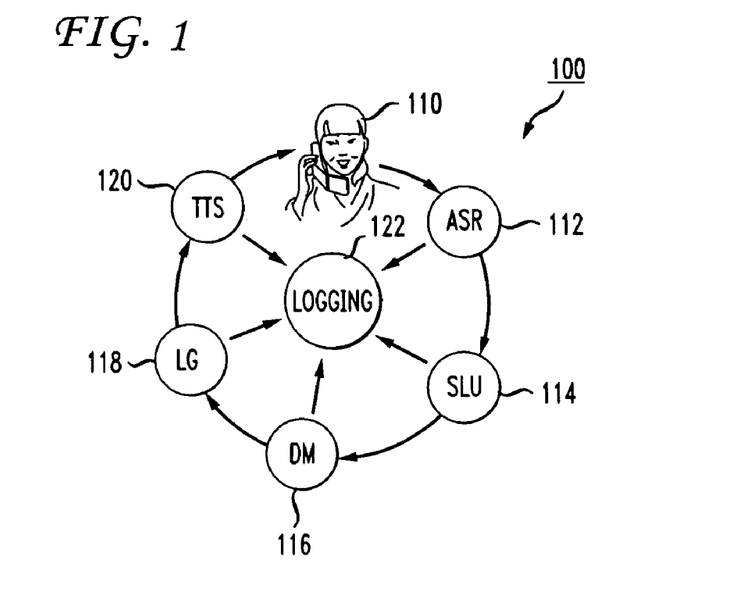
FIG. 1 illustrates the basic components of a spoken dialog system with the logging module.

The basic components of a spoken dialog service include an automatic speech recognition (ASR) module, a spoken language understanding (SLU) module, a dialog manager (DM), a language generation (LG) module and a text-to-speech (TTS) module. These components work together to provide the spoken dialog interaction with the user. These are shown in FIG. 1 and the features associated with the invention are explained more fully below. A spoken dialog system enables a service provider to hear the speech provided by the user, convert the speech to text and understand the meaning or user's intended message in the speech, and to generate an appropriate response.

As a spoken dialog service is deployed, a large quantity of data regarding the user conversations may be logged to obtain information about the behavior of the system and how people interact with the system. This data can provide important details about trends and developments in the area of customer relations management. One of the downfalls of such a system, however, is that human agents are no longer involved in the interactive process and it becomes more difficult to gauge the user experience with the automated system. The automated system has a more difficult time distinguishing the level of user dissatisfaction or satisfaction with the system without engaging in a dialog to request that information.

Further, as companies deploy more automated systems for handling interactions (telephone calls, e-mails, instant-messaging (IM) sessions, chats, etc.) with their customers, the opportunities for human agents to track customer satisfaction decrease. Much of the current analysis of spoken dialog systems focuses on how to deploy and tune the system, which information does not provide helpful business-related data. Therefore, what is needed in the art is a system for obtaining information about user satisfaction and other business-related data from an automated spoken dialog service.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The invention comprises methods, systems and computer-readable media related to reporting data from a spoken dialog service. The method of reporting data from a spoken dialog service comprises extracting from a dialog logging module data regarding user dialogs with the spoken dialog service, analyzing the data to identify trends, and reporting the trends. This data typically is in the form of business-related marketing data but it can take on any useful form or subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 7 illustrates a table of dialog records returned by a query; and

DETAILED DESCRIPTION OF THE INVENTION

The present invention may be understood with reference to the attached figures and the following description of the preferred embodiments. The invention may be practiced using any appropriate programming language and may operate on a computer server or combination of computing devices connected in such a manner as to obtain the necessary spoken dialog information and report trends and the like.

Exemplary embodiments of the invention relate to a tool or software module that analyzes information contained in spoken dialog system logs and presents the information in a readily comprehensible form suitable for use by system designers, call center customers and others. Relevant features (such as calls to cancel a service) may be extracted from the logs of caller-system interactions and tracked by trend analysis software. Tracked features that move outside their expected bounds on a given day generate headlines as part of a web site generated automatically from each day's logs. An example web-page headline would report a statistically high number of consumers that cancel service on a given day. Links associated with the headline enable the user to "drill-down" to the underlying data supporting the headline. The drill-down facility allows the user to investigate the underlying data to the point of viewing logs of individual interactions and listening to audio dialog.

The data obtained from call-logs may be useful in evaluating and improving the dialog system itself, in organizing call centers served by the automated system, and in providing business intelligence based on the behavior of the callers. Reports are routinely generated from conversation logs generated by spoken dialog systems. Such reports may track, for instance, where the system routes calls. These reports rapidly become cumbersome and difficult to interpret. The system according to an embodiment of the invention uses the log data generated by applications running a spoken dialog service. The invention aims to make the log data a useful source of both system evaluation and business intelligence by using trend analysis, simple natural language generation, database and visualization technology to present a high-level view of newsworthy events which allows drill-down all the way to the logs and even the audio files associated with individual transactions or calls.

Natural language spoken dialog systems begin their interaction with a user by interpreting user response to an open prompt such as "how may I help you?" User responses are recognized using a statistical language model. The resulting input is tagged for the presence of domain-relevant "named entities" and mapped to one of a set of call types using a data-driven classifier. On the basis of the call type, the named entities and the dialog history so far, the dialog manager determines a response to be played to the user, or alternatively, where to route the call.

The system logs the user-system interaction to a database as a set of time-stamped events generated by the various system components. Among the recorded events are prompts, audio, recognition output, classifier output, and call routing behavior. Each night (or at any set time period), an XML document is generated consisting of a sequence of dialog elements, one for each call, each consisting of a time-ordered sequence of the various logged events. All applications built on the platform share the same log file format, but differ in their particular recognition grammars, call type set, dialog structure, and routing destinations.

As can be appreciated, these reports may be generated more or less frequently depending on the need for the data. For example, if the desire is an hourly report, such a report may be generated each hour.

The first embodiment of the invention relates to a method of automatically logging call information to analyze and report on customer trends in a systematic and efficient manner. A benefit of such a system includes the ability to receive a rapid or real-time turn-around in identifying significant changes or trends in the customer experience.

FIG. 1 illustrates the basic spoken dialog system 100 with a logging module. The ASR module 112 receives voice input from the user 110 and converts the speech signals into text. The SLU module 114 seeks to understand the text to determine the meaning intended by the user. The DM module 116 determines an appropriate response based on the intent of the user's question or comment. A language generation module 118 will generate the text of the response and transmit the text to a TTS module 120 to synthesize the speech audibly presented to the user.

As a main component of the system according to the present invention, the logging module 122 receives data from each of the other spoken dialog modules to track and receive information regarding the timing and substance of the interactions. For example, in a customer care application for a telephone company, the call types will likely relate to billing or service issues. As a user calls to ask about their bill, the ASR component 112 and SLU 114 component operate to convert the speech to text and will understand that a question such as "I need to ask about a charge on my bill" relates to a billing question. This information can be transmitted to the logging module 122 to store and record the time of the inquiry, substance of the inquiry and other detailed information. This information may relate to the specific user, the geographical location of the user, etc.

In another example, if a storm or other problem causes a service problem or disruption for a specific geographical area, the logging module 122 can track the calls from that area as well as follow-up actions by the users. The detection of a large number of calls regarding service disruption or complaints from a specific area can be captured and reported in real-time by using the data obtained from the logging module 122. Furthermore, by tracking the call time, the logging module 122 can then also trace if users in that same geographic area cancelled their phone service in response to the service disruption. Therefore, the telephone company could track and identify trends and important events with their customers. This enables real-time or almost real-time modifications of the system or service to reduce negative responses from events within or without the control of the service provider.

Another example relates to services offered by the company. Using the telephone company as an example again, suppose that a new long distance service has just been offered. The logging module 122 can identify and track geographically the users that sign up for the plan and the data may be utilized to compare specific areas to national averages. This data can then be used by the marketing and other departments to maximize service opportunities for that area of users.

The system 100 may also include a server (not shown) that retrieves the logs obtained by the logging module 122 and automatically performs an analysis of the logs to identify valuable and important trends within the logs. The server operates software that obtains the data in the logs, analyzes, summarizes and presents the data in various convenient forms. The server may automatically generate periodic reports on noteworthy developments in the use of the dialog system and extract data from the logs such as a time-sequence of values for each of a specific set of features. An example of this would be that if the company wanted to track cancellations of their service, they could obtain from the logs the time information and also geographic information for the individuals canceling their service. Noteworthy trends can then be identified and acted upon.

Correlations and anomalies in the trends identified can be studied by the company to obtain more information and analysis from the trends. A report may also be automatically generated for the company either in text or in a headliner fashion where the most important information is presented first. For example, the approach used by newspapers to highlight important news events on the front page with headlines may be employed to present the identified trends. Summaries and statistical graphs may be presented to assist managers and executive of the company whose customers are making the calls to the spoken dialog service to respond to the trends in an appropriate fashion.

Figure 2:
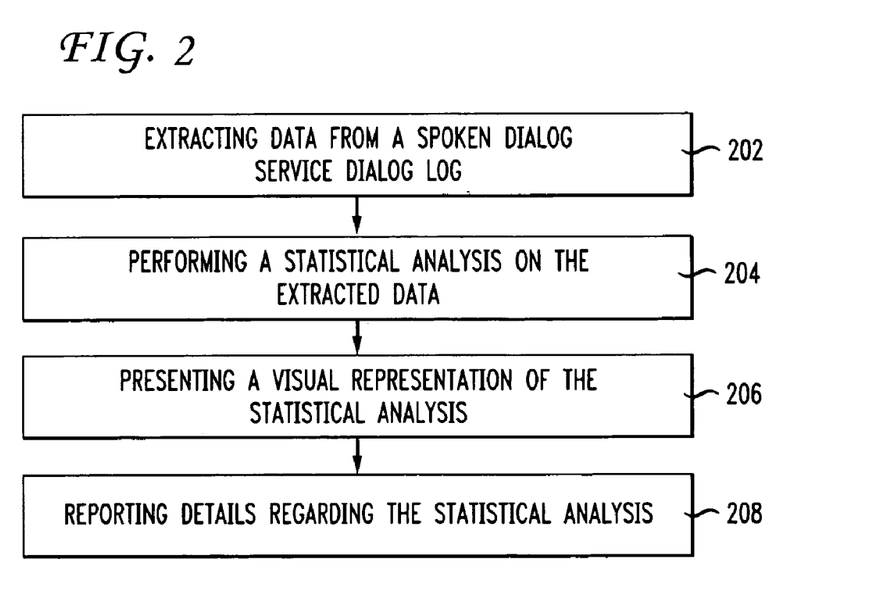
FIG. 2 illustrates a method according to an aspect of the present invention.

FIG. 2 illustrates a method according to the present invention. The method comprises extracting data from the spoken dialog service dialog log (202). This log, as indicated above, includes many details regarding the timing and substance and choices made by a user during the spoken dialog process. This information may be as detailed as specific choices made and statements made during the dialog or may be as general as the final result (signed up for new service; cancelled service; made payment; etc.). Next, the method comprises performing a statistical analysis on the extracted data (204) to identify trends and information of interest to the company. In one aspect of the invention, the information gained from the statistical analysis is presented visually to the company or a user to facilitate understanding of the data and to highlight the important aspects of the data. The method does not require a visual presentation but it can be helpful in many circumstances to visualize trends in the data.

The method finally comprises reporting (208) to the company. The report can also take any form that is convenient, such as being performed via a web-based reporting mechanism or a sophisticated graphical and interactive facility to enable a user to investigate the details of a given statistic. In this regard, if a statistic shows that on a given day twice as many users signed up for new service, the company could explore other events or other information to seek to identify the positive trend and why on that day so many more people signed up for the new service.

Another method aspect of the invention relates to a method of automatically modifying a spoken dialog service based on reported trends and information. An example system is where users of a service interact with the service provider of the service via the spoken dialog system. In this method, the user may have an opportunity to interact with a provider of a service such as a telecommunications provider, cable provider, internet provider, or satellite services provider. Other providers of business or personal services are also contemplated, for example, on-line computer sale companies such as Dell®. These providers may have features of their service affected by events outside their control. As users interact with the provider of the service via a spoken dialog service, the spoken dialog service can "be aware" of current events and trends. This method enables automatic modification of the dialog management module and perhaps other modules in the system so that the dialogs are based on up-to-date information.

The method comprises identifying data that may affect a feature of the service and that may be outside the context or control of the service provider. Examples of such data include natural disasters and the like where service may be interrupted. Market data or competitive business data such as special offers from competitors may also be data that is outside the control of the provider of the service. Each type of data considered here will affect a feature of the provider of the service in terms of the quality of service, the cost of the service and so forth. The method further comprises adjusting the spoken dialog system according to the identified data, wherein as users communicate with the provider of the service via the spoken dialog system, the options presented to the user via the spoken dialog system account for the identified data.

In this regard, consider a telephone company. If a power outage will affect the quality of service because the service will be interrupted for a period of time, statistics may show that a certain percentage of users will likely cancel their service or switch to a different provider based on their frustration with the power outage. The present invention involves adjusting or modifying the spoken dialog service such that when users call in to complain or the switch their service, the spoken dialog seeks to explain the problem, present offers to dissuade the user from switching or canceling service, or other options to reduce the likelihood that the user will cancel or switch service providers.

Similarly, the data outside the control of the service provider may relate to market or competitive business data. In this regard, if a competitor advertises a special deal for their service, and the provider of the service can identify that the effect on their customer base may be a certain percentage of users will switch to the competitor, then the provider of the service can counter that affect by adjusting the spoken dialog service to match or beat the offer or take some other step to reduce the likelihood that users would cancel the service.

This adjustment may also be performed on a regional or geographical scope that only covers the geographic areas that are affected by the identified data. For example, if the power outage is only in a certain city, then the adjusted spoken dialog system will only make the adjusted offerings to callers from that affected city.

Figure 3:
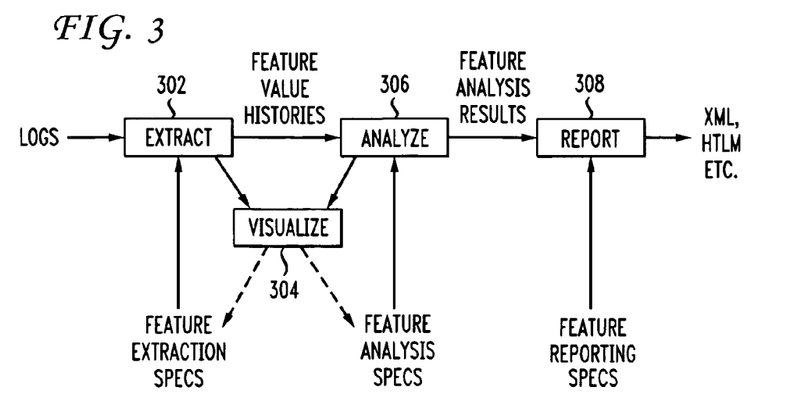
FIG. 3 illustrates an example architecture according to an aspect of the present invention.

FIG. 3 illustrates the basic architecture 300 of the present invention. The extraction module 302 extracts the data from the dialog logs. Feature extraction specifications identified by the company or other source can help the extraction module 302 to obtain specific pieces of data that are most relevant. An analyzer module 306 analyzes the feature value histories or data that was extracted. The extracted data and the data generated by the analysis module 306 can provide data to a visualization module 304 that presents a summary or a report in a visual manner to the user. The visualization module 304 may only be employed in one aspect of the invention during the development phase of a spoken dialog service. The feature analysis results are transmitted to a reporting module 308 that will receive instructions such as the feature reporting specifications and then generate in XML or HTML or other suitable format a report to the user or company regarding the data.

One of the benefits of such a system is that it can also enable the company to gauge how well the spoken dialog service is working. For example, if a new dialog component was implemented that handled calls differently, then the system can automatically generate reports on how well the customers did in their interaction with the new system. Thus, if the report indicates that after the deployment of the new dialog pattern, there were many customer complaints or many transfers to a live agent, then this new dialog service may not work for the company.

In this regard, the automatic dialog logging and reporting system adds value in a number of different areas for the company with regards to their business services, their customer relationship, and the overall success and convenience of their spoken dialog service. Modifications to the dialog patterns or other aspects of the spoken dialog service may be made based on the reported trends. The administrators of the spoken dialog system may be notified immediately of changes in customer usage patterns and thus enable timely improvements to the system and add value to the customer relationship. In some cases where a company has a spoken dialog service that is being hosted by another company, the hosting company can provide its client with valuable business information and thus improve the business relationship between the hosting company and its client.

Figure 4:
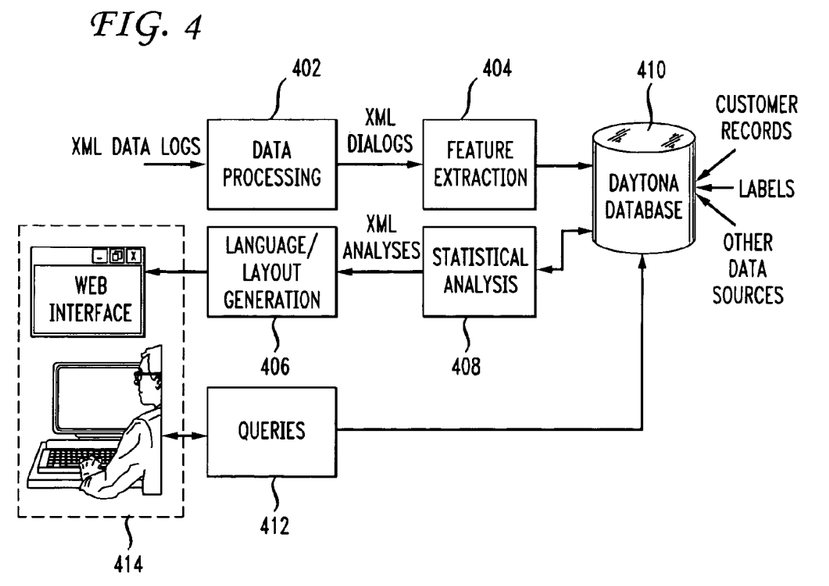
FIG. 4 illustrates an example architecture according to an aspect of the present invention.

FIG. 4 illustrates another aspect of the invention in terms of system architecture 400. Each night, or in any chosen interval, the previous time period's set of dialog logs is processed by a data processing module 402 to extract dialog and turn level features. The data may be in the form of XML data logs or some other form received by the module 402. XML dialogs are an example output of the processing module 402 and input to the feature extraction module 404. These processes enable the system to track and identify trends in the features and perform other statistical analysis. The resulting statistics and perhaps accompanying alerts are structured into a layered web site providing access to the feature database and a see calls visualization tool. Those of skill in the art will understand the operation of the visualization tools for viewing such data and therefore more detailed information is not provided here.

The output of the feature extraction module 404 is transmitted to a database 410 that also receives customer records, labels and other data. Other data (not shown) but discussed above may be provided to the database 410. This other data may be data outside the control of the provider of service such as data related to power outages, natural disasters, market or competitive business intelligence data. Such data may further include internal data that may relate to known issues that would affect customers positively or negatively. Thus database 410 may represent dialog data and other types of data that can be drawn upon to provide information about the spoken dialog service or enable automatic adjustment and modification of the spoken dialog service. Further interaction with this database occurs as will be explained below. When extracting features from the XML dialogs, the system 400 via the feature extraction module 404 applies XSLT templates to add structural elements dividing the stream of events in each dialog into a sequence of turns. A turn is considered to consist of a system prompt, the user response as recognized by the system and any records associated with the system's processing of that response. Much of the analysis and evaluation relevant to spoken language systems naturally operate on the turn level.

From the turn-based representation, a set of features is extracted for each dialog and for each turn within a dialog. The extraction specification for each feature is represented declaratively as a fragment of XSLT. This specification drives the construction of style-sheets used for the actual extraction as well as documentation.

An example of extracted dialog features include the Automatic Number Identification (ANI) for the call, the number of turns, the length of the call, any final routing destination and the final actionable call type. This is the last call type the classifier obtained before routing or hangup which does not fall into a predetermined set of vague or uninformative call types, or simply the last if none such exist.

Turn features include the prompt and speech recognition output, the classifier call type and the length of the turn. Feature values are deposited in the database 410 and used by the statistical analysis module 408. An example of the database 410 is AT&T's Daytona database technology that combines huge capacity and fast operation with simplicity of administration and flexibility of using its own 4GL Cymbal, SQL or normal UNIX text processing tools on the database tables.

A function of the statistical analysis module 408 may also include trend analysis to generate an XML document specifying, for each feature that is being tracked, the frequency of reach value of that feature and the change which that frequency represents from the historically determined expected value. If the change is more than a given magnitude, the feature/value combination is considered to constitute an alert.

The layout and language generation module 406 receives the XML analysis from the statistical analysis module 408. The frequency and alert information for all the tracked features and a large number of pre-prepared plots accompanied with XML descriptions are processed into a layer website using a series of cascaded XSLT transformations.

As a step towards making the system configurable for different audiences, and to utilize user feedback, the selection of newsworthy feature-value pairs takes into account not only the level of alert (such as signifying the statistical deviation from the expectation) but also the end-user and application-specific set of ranking customizations which indicate the importance of the particular feature-value combination in a given application to the end-user of the report. For instance, in a customer care application with dozens of call types, the dialog designers may be interested in any changes in the relative frequency of a call type paired with the sequence of system prompts up to that call type. The call center managers may be mostly interested in variations in the number of calls that are routed to human representatives, while the product managers may want to track inquiries about a particular product following an advertising campaign.

Newsworthy features generate front-page "headlines" in simple natural language using XSLT templates with some random variation in lexical choice and syntactic form. The headlines describe single feature/value pairs, call type values that rise above or fall below expected frequencies. An example headline may be: "the number of customers calling to request balance fell by 25 percent." The presentation of headlines can mimic a newspaper headline approach.

Figure 5A:
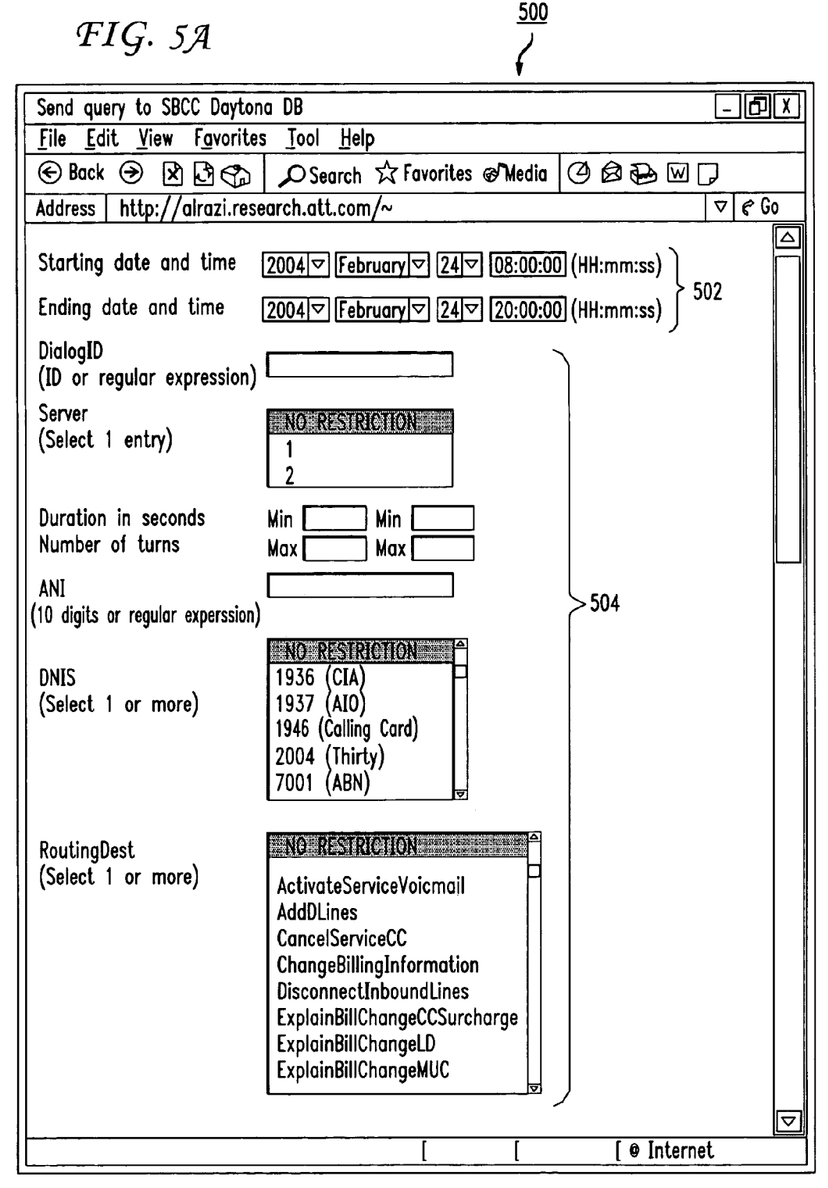
FIG. 5A illustrates a top portion of an example webpage for submitting an inquiry into a database of spoken dialog system data.
Figure 5B:
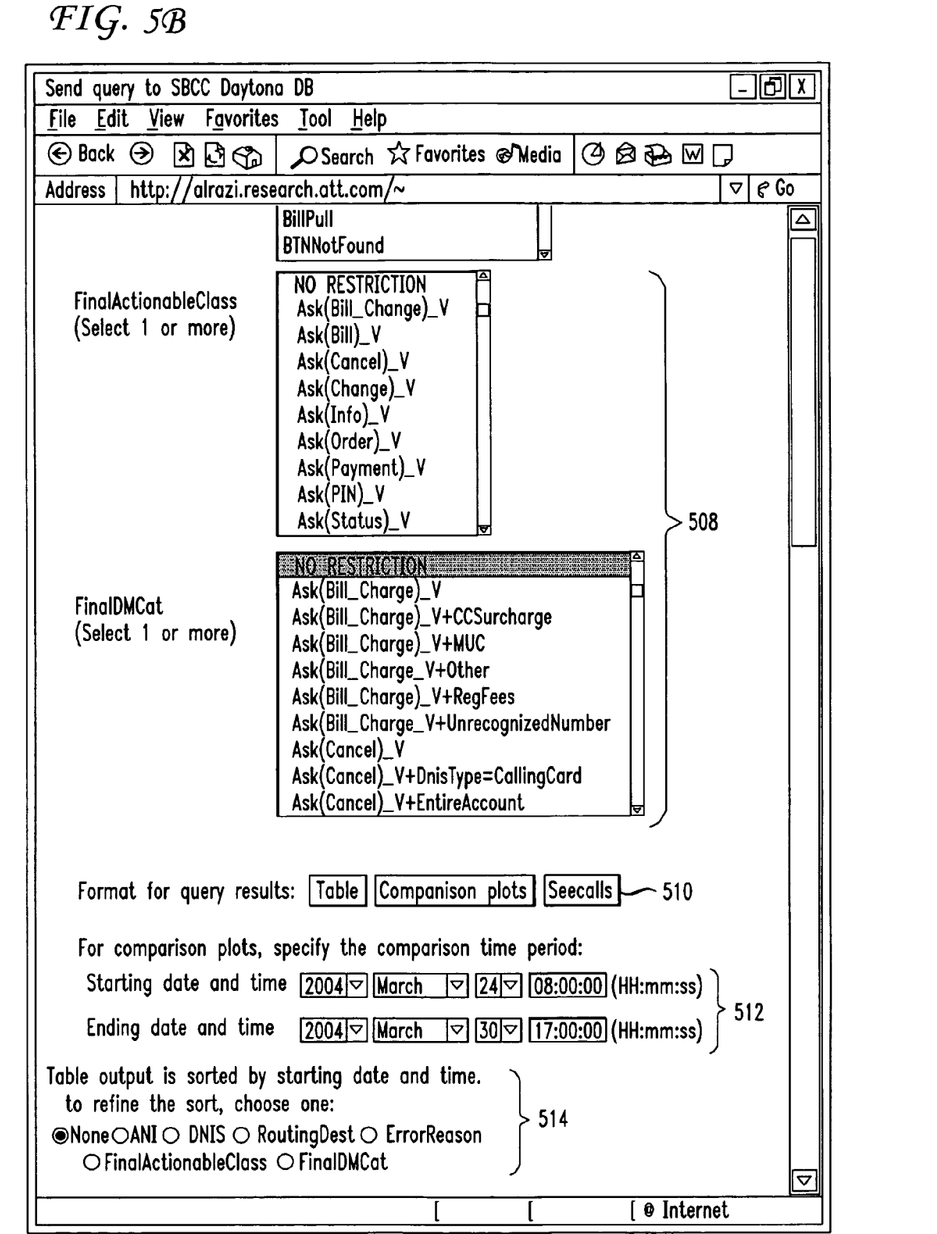
FIG. 5B illustrates a bottom portion of an example webpage for submitting an inquiry into a database of spoken dialog system data.

Queries 412 may come from a user or other sources to the database 410 where information is sought about the data. A web interface 414 is the preferable interface to the data and to the information regarding the headline news. FIG. 5A illustrates the top portion of an example query interface 500 for an end-user. The type of information the user may input to query the database includes such information as a starting and ending date and time 502. Other information is shown, such as the DialogID, the server number, a duration value, the number of turns, the ANI or DNIS number, or a routing destination 504. FIG. 5B illustrations a bottom portion of an example query interface. This portion of the interface shows classification and categorization features for task objectives 508, options for formatting the query results 510, starting and ending time selects 512 and output options for sorting and refining reports 514. Other parameters and values may also be used in a query by the user.

Figure 6:
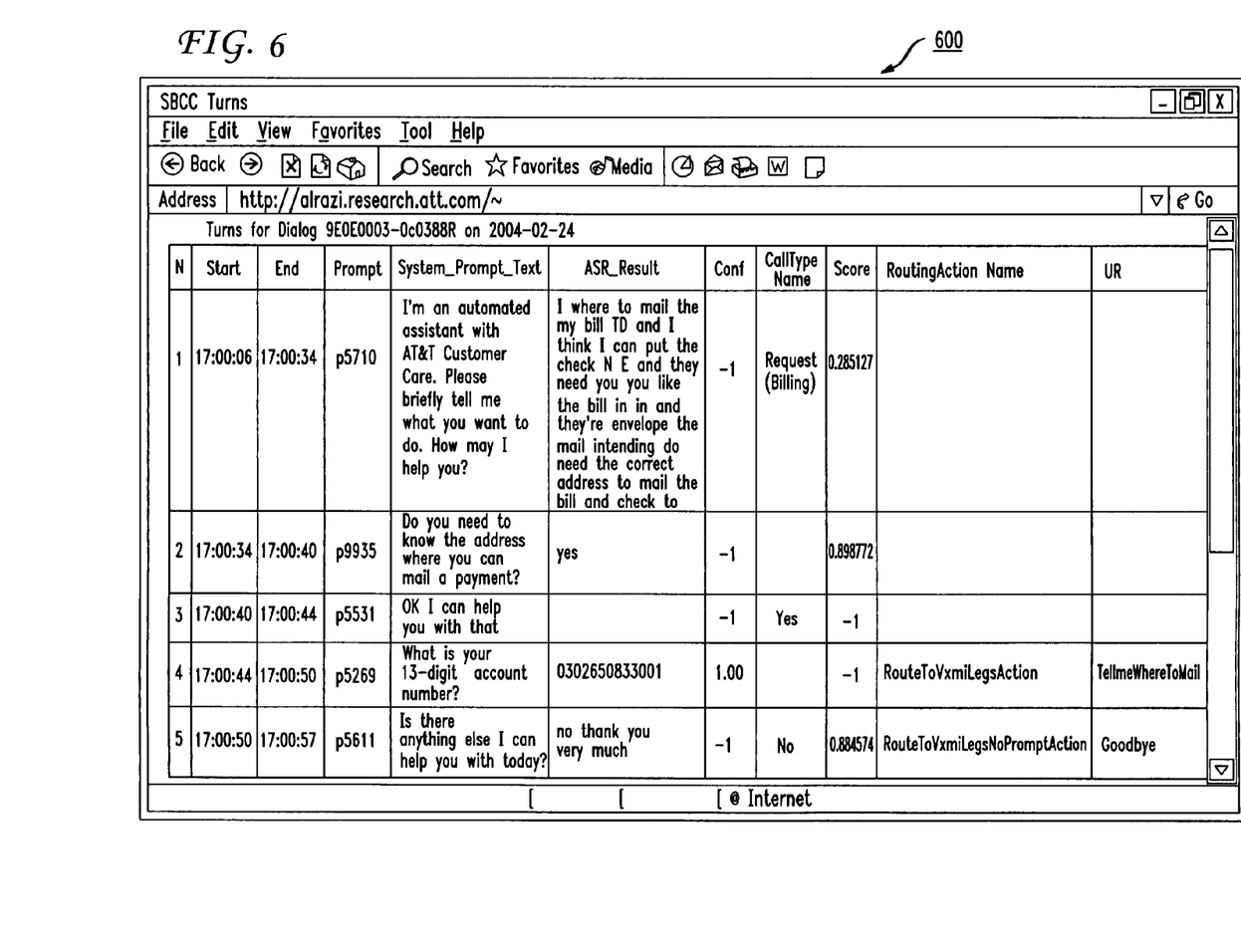
FIG. 6 illustrates a table showing data related to dialog turns in a conversation with the spoken dialog system.
Figure 8:
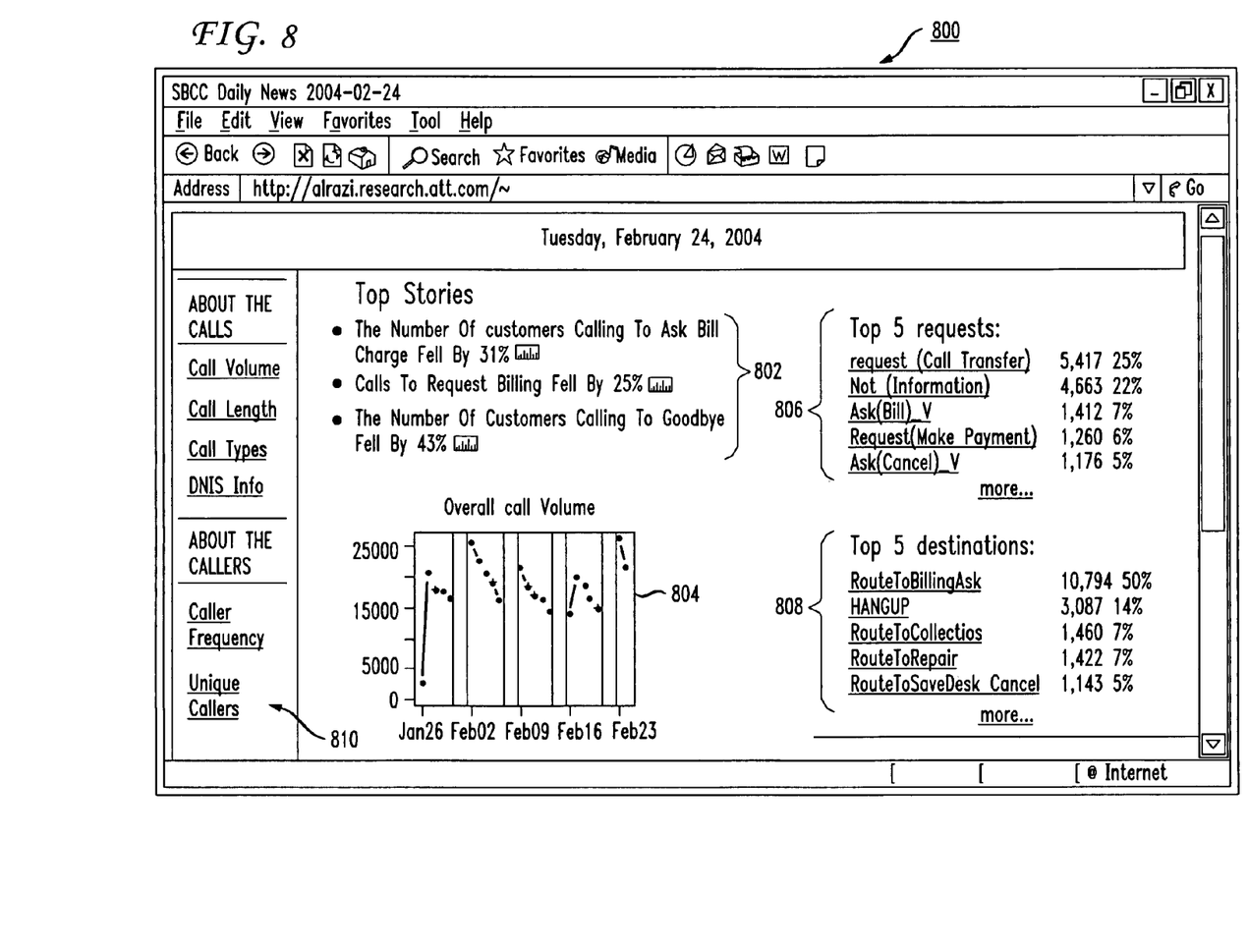
FIG. 8 illustrates a headlines webpage according to an aspect of the invention.

This description will now discuss FIG. 8 before further discussion on FIGS. 6 and 7. FIG. 8 illustrates a window 800 of an example "front page" showing such features as top stories 802, the overall call volume 804, the top five requests from callers 806 and top five destinations 808. The top values shown are those commonly desired by the end-user but the system is configurable so that the user may view anything desired. Arrows are optionally provided that give an indication, much like a stock market indication, of the direction of the trend. The arrow gives a basic indication and magnitude of the change in the trend. Each line in the tables 806, 808 provide a link to a page showing a plot of the feature-value pair's frequency and proportional frequency movements over a period of time and can utilize a moving window to view and track trends over time.

The left column 810 of window 800 illustrates links to pages containing a number of plots and tables detailing innovation which may be interest on a particular visit to the site but which is not considered high priority "news". For example, under the "call volume" link it shows a map which color-codes states based on the volume of calls originating there, among other plots of call volumes as functions of various other features.

The middle section of FIG. 8 shows by way of example the day's news headlines 802. Features generating an alert are presented in this section and brought to the user's attention.

Links on each headline lead to a trend plot page, similar to the other links discussed above from the tables 806, 808. In these plots, the sequence of actual values over time is shown along with bounds indicating the currently expected range of volume for the feature in question. From either page 800 or a linked page, a drill-down page may be available that provides a query to the database 410 to retrieve more detailed information about the dialogs behind the headlines. The link brings up a form pre-populated to select dialogs from the current day and the feature-value pair that is currently being investigated. All query features can be varied in the form, for instance to add other values for the same feature in order to make comparisons. The user can also drill down into the underlying data supporting headlines and even listen to particular dialog turns.

The user chooses how the dialogs selected by the query are displayed. For example, there may be three options. First, to simply extend the drill-down facility all the way to turns wherein the first page shows a line for each dialog, which may be selected to whose the main features (prompt, recognition output, call type) for each of the turns in the dialog including the ability to play audio where available (see FIG. 7). The second option provides a page of plots showing various features of the selected dialogs plus selected comparison sets, such as dialog selected by the same query over a longer time period. The third display option is to send the dialogs returned by the query to SeeCalls, the interactive visualization and data exploration tool.

Applying the statistical analysis and visualization techniques to the dynamic behavior of spoken dialog systems offers benefits for system evaluation and diagnosis and for domain-oriented data mining. Other features that may be explored using the techniques disclosed above include using information from sources other than the dialog system logs, such as customer databases, and features derived from recorded audio where available. Other information may also be added to the database 410 to provide value. For example, if an earthquake or power outage occurs in an area that results in downed telephone lines that result in a service interruption. This information may be correlated with a spike in cancellation call-types for that area and presented to the end-user to aid in identifying a reason for a particular trend.

FIG. 6 illustrates example data 600 regarding the turns for a particular dialog. The data provided that relates to the turns in the dialog is organized by system prompt and ASR result, and then the next prompt is shown as being part of the next "turn." Timing information, call types, a score associated with the ASR results, and other data associated with each turn are also provided. FIG. 7 illustrates a window 700 having the dialog records return by a query. The information in the table 704 includes such data as the starting and ending time, the number of turns, the routing destination and the reason for an error in the dialog. For some dialogs, a speaker icon 702 provides indication that an audio record is available. Clicking on the audio icon may begin the audio of the particular turn for the user.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method of reporting data from an automated spoken dialog service, the method comprising:
   extracting data regarding user dialogs with the automated spoken dialog service, and not with a human agent, using a dialog logging module within the automated spoken dialog service;
   analyzing the data to identify trends for at least one geographic area to yield identified trends;
   comparing the identified trends for the at least one geographic area with an average in a wider geographical area containing the at least one geographic area;
   modifying the automated spoken dialog service on a geographic basis according to the identified trends and comparison;
   based on the analysis of the data and the comparison of the identified trends, generating top natural language headlines, each of which describes at least one identified trend; and
   displaying the generated top headlines to a user.

2. The method of claim 1, further comprising presenting a visual representation of the data.

3. The method of claim 1, wherein analyzing the data further comprises analyzing a time-sequence associated with the data.

4. The method of claim 1, wherein extracting the data further comprises extracting the data according to a specified set of features.

5. The method of claim 2, wherein displaying the generated top headlines further comprises presenting a summary of the identified trends.

6. The method of claim 1, wherein the identified trends relate to user patterns over time.

7. The method of claim 2, wherein displaying the generated top headlines further comprises generating an XML-based report.

8. The method of claim 2, wherein displaying the generated top headlines further comprises generating a web-based report.

9. The method of claim 2, wherein displaying the generated top headlines further comprises:
   presenting a user with the option to drill down into the analyzed data.

10. The method of claim 9, wherein presenting the user with the option to drill down into the analyzed data further comprises presenting the user with the option to hear user dialogs.

11. A system for reporting data generated from an automated spoken dialog service, the system comprising:
   means for extracting from a dialog logging module data regarding user dialogs with the automated spoken dialog service and not with a human agent;
   means for analyzing the data to identify trends for at least one geographic area to yield identified trends;
   means for comparing the identified trends for the at least one geographical area with an average in a wider geographical area containing the at least one geographic area;
   means for modifying the automated spoken dialog service on a geographic basis according to the identified trends and comparison;
   means, based on the analysis of the data and the comparison of the identified trends, for generating top natural language headlines, each of which describes at least one identified trend; and
   means for displaying the generated top headlines to a user.

12. The system of claim 11, further comprising means for reporting trends and enabling a user to drill down into the analyzed data, wherein the user can choose to view the analyzed data and hear user dialogs.

13. A non-transitory computer-readable storage medium storing executable instructions for controlling a computing device to report data generated from an automated spoken dialog service, wherein under the control of the instructions, the computing device performs the following steps:
   extracting from a dialog logging module data regarding user dialogs with the automated spoken dialog service and not with a human agent;
   analyzing the data to identify trends for a geographic area to yield identified trends;
   comparing the identified trends for the geographical area with an average in a wider geographical area containing the geographic area;
   modifying the automated spoken dialog service on a geographic basis according to the identified trends and comparison;
   based on the analysis of the data and the comparison of the identified trends, generating top natural language headlines, each of which describes at least one identified trend; and
   displaying the generated top headlines to a user.

* * * * *